3,097,527
FLOW METER
Billy E. Davis and Leslie E. Gormley, Houston, Tex., assignors to Computers, Incorporated, a corporation of Texas
Filed Feb. 2, 1959, Ser. No. 790,681
5 Claims. (Cl. 73—205)

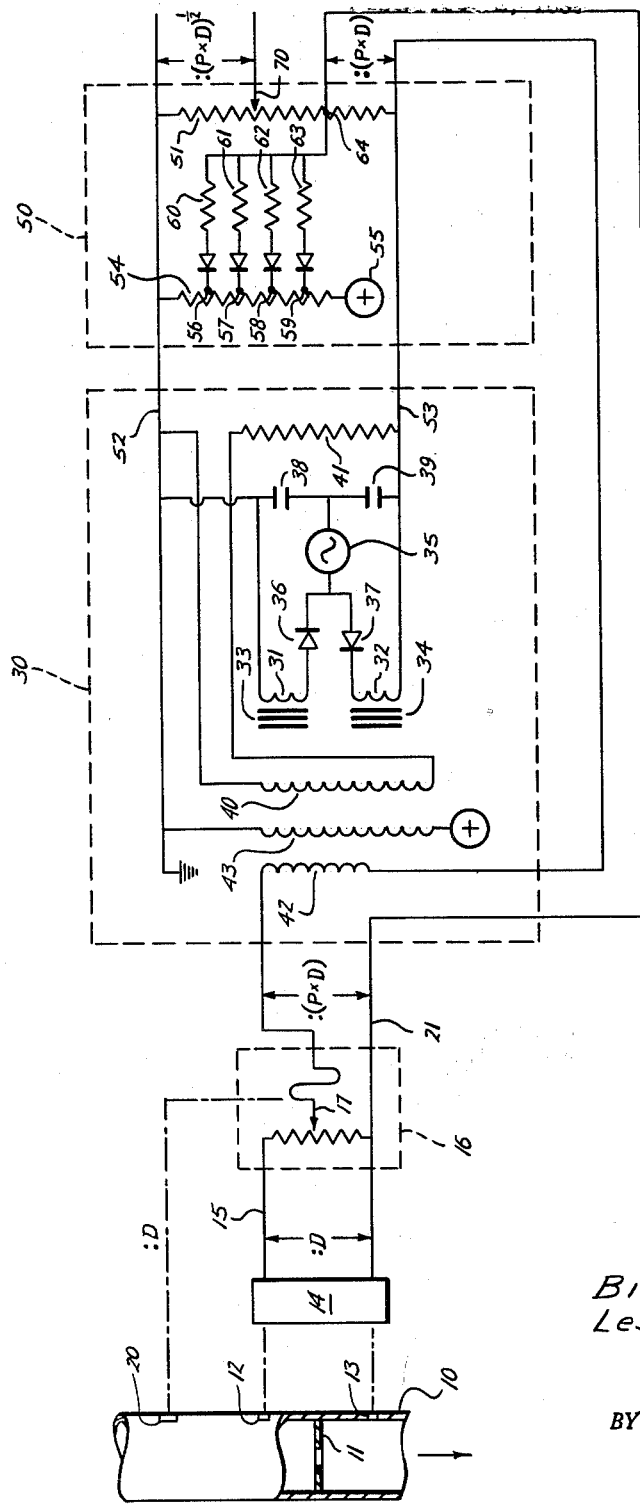
Billy E. Davis
Leslie E. Gormley
INVENTORS

United States Patent Office 3,097,527
Patented July 16, 1963

This invention pertains to flow meters, and more particularly to electrical apparatus for computing the flow from measurements made of the static pressure in a pipe in which fluid is flowing and of the pressure drop across an orifice placed in the pipe adjacent the point of measurement of the static pressure.

The computer operates to solve the equation $$F = C\sqrt{D \times P}$$

where
$F$ = rate of flow
$P$ = static pressure
$D$ = drop in pressure across orifice
$C$ = constant As important feature of the invention lies in the simplicity of the apparatus used to solve the foregoing equation, resulting in a considerable reduction in cost of the apparatus as well as providing greater reliability of performance.

Briefly the invention contemplates the production of a voltage proportional to D which is fed to a potentiometer to produce a current proportional to D. The tap on the resistor is varied in position proportional to P so that the potentiometer output voltage is proportional to $D \times P$. The latter voltage is fed to a magnetic amplifier, the output of which is fed to a square root network whose output voltage is then proportional to $(D \times P)^{1/2}$.

For a more detailed description of a preferred embodiment of the invention reference will now be made to the accompanying drawing which is an electric circuit diagram of an apparatus embodying the invention.

The rate of flow is to be measured in pipe 10. An orifice 11 is disposed in the pipe at the point where the rate of flow is to be measured. Pressure probes 12, 13 are disposed in the pipe on opposite sides of the orifice and connected to electro-mechanical transducer 14 which produces a voltage across its output terminals 15, 21 proportional to the pressure differential D across the orifice.

The output of the transducer 14 is fed to potentiometer 16. The position of the midtap 17 of the potentiometer is varied by a mechanical or other suitable connection to a pressure probe 20 so that the ratio of the resistance of the potentiometer between midtap 17 and output terminal 21 to the whole resistance of the potentiometer varies directly in proportion to the static pressure P in the pipe 10. With no current flowing in the potentiometer output, the input current to the potentiometer is proportional to the input voltage D and the output voltage is therefore proportional to $D \times P$. The output of the potentiometer 16 is fed to magnetic amplifier 30.

The magnetic amplifier includes two saturable core reactors having power windings 31, 32 wound on cores 33, 34. These reactors are respectively in series with the two loops of a voltage doubling rectifier comprising source of alternating current power 35, rectifiers 36, 37, and capacitors 38, 39. The amplifier further includes a positive feedback winding 40 in series with load resistor 41 across the output of the voltage doubling rectifier circuit. The amplifier also has an input or control winding 42 and a bias winding 43, the latter being connected to a suitable source of direct current power. The ampere turns of the bias winding are opposed to those of the feedback winding, thus producing a negative bias. The ampere turns in the positive feedback winding is so large that the cores 33, 34 tend to become saturated as soon as energizing current flows in control winding 42. Therefore by connecting any part of the output circuit of the amplifier, or any part of the following circuit dependent thereon, so that it neutralizes the effect of current flow in the control winding, that part of the output will follow the input faithfully, as to current or voltage according to the mode of connection, within the operating range of the amplifier. A high gain amplifier of this type will herein be referred to sometimes as a servo-amplifier. The magnetic amplifier output is connected to a square root network 50.

The square root network includes a resistor 51 connected across the output terminals 52, 53 of the magnetic amplifier, in parallel with the series combination of load resistor 41 and feedback winding 40. The square root network further includes a resistor 54 connected between amplifier output terminal 52 and a source of direct current power 55. A plurality of taps 56—59 from the resistor 54 are each connected through a rectifier and one of the resistors 60—63 to a tap 64 on resistor 51. The values of the resistors 51, 54, 60—63, and the location of the taps 56—69 and 64 and the magnitude of the reference voltage of source 55 relative to the output voltage range of the amplifier are chosen so that the current flowing from tap 64 through resistor 51 to amplifier terminal 52 is proportional to the square root of the current flowing from amplifier terminal 53 through resistor 51 to tap 64.

The portion of resistor 51 between tap 64 and amplifier terminal 53 is connected in series with control winding 42 to the output of potentiometer 16. Such portion may be referred to as a third resistor while the portion of resistor 51 between tap 64 and amplifier terminal 52 may be referred to as a second resistor. Whenever there is a change in the output voltage of the potentiometer 16 tending to produce a current in the control winding 42, the amplifier 30 responds to produce enough current in resistor 51 between amplifier terminal 53 and tap 64 such that the drop thereacross equals the output of the potentiometer. Therefore the voltage across the portion of resistor 51 between tap 64 and amplifier terminal 53 is also proportional to $P \times D$, and due to the square root network the voltage across that part of resistor 51 between tap 64 and amplifier terminal 52 is proportional to $(P \times D)^{1/2}$ or the rate of flow of fluid in pipe 10. A suitable fraction of this voltage appears between output terminal 52 and variable tap 70.

Although a magnetic amplifier has been provided in the preferred embodiment above described, other types of amplifiers can be used, e.g. a high gain electronic amplifier. However it is important that the amplifiers have sufficient power output to drive the square root network.

It is important to note that in the servo system of the invention a voltage in the square root circuit is balanced against a voltage at the amplifier input so that no current flows in the control winding under steady state conditions. This is important since there is thus no extraneous load placed on either the potentiometer circuit 16 which provides the means for multiplying P by D nor on the square root network 50 which provides the means for extracting the square root of the quantity $(P \times D)$. This increases the accuracy of the apparatus.

While a preferred embodiment of the invention has been shown and described, modifications thereof can be made by one skilled in the art without departing from the spirit of the invention and it is desired to protect by Letters Patent all forms of the invention falling within the scope of the following claims.

We claim:

1. A flow meter comprising a length of pipe having an orifice therein, an electro-mechanical transducer having a mechanical input and electrical output, means connecting the mechanical input of the transducer to the pipe to respond to the pressure drop across the orifice, a potentiometer including first and second ends and a center tap, electric conductor means connecting the ends of the potentiometer to the electric output of the transducer, means responsive to the static pressure in the pipe on one side of the orifice to vary the distance of the center tap of the potentiometer from one end thereto in proportion to the variations in said static pressure, a magnetic amplifier of the saturable reactor type including a control winding, a bias winding, and a feedback winding, means connecting said bias winding to a source of direct current potential, means including a first resistor in series with the feedback winding connecting said feedback winding and first resistor across the output of the magnetic amplifier, said feedback winding being wound for positive feedback, a square root network including second and third resistors connected in series across the output of the amplifier and a fourth resistor series connected to the amplifier output terminal to which said second resistor is conected and a source of direct current, said square root network further including a plurality of rectifiers each connected in series with a portion of said fourth resistor and the juncture of said second and third resistors, and electric conductor means connecting in series said third resistor, said control winding and the portion of said potentiometer between said one end and said center tap.

2. Computer for determining the value of a function of the form $(P \times D)^{1/2}$ where P and D are independent variables comprising first means for producing a voltage proportional to D, potentiometer means have an input and an output, means connecting the first means to the input of the potentiometer means, means for varying the output resistance of the potentiometer in proportion to P, a servo amplifier having an input coupled to said potentiometer output and an output, a square root network means having an input portion and an output portion whose current is proportional to the square root of the current in said input portion, electric conductor means connecting the input of the square root network means to the servo amplifier output, said square root network means including a first resistor in series with said input portion to carry the input current and produce a voltage thereacross proportional to said input current, electric circuit means including a control winding, a feedback winding, and a bias winding, said control winding connecting said first resistor and potentiometer output in series opposition, with said bias winding being in opposition to said feedback winding to provide a negative bias said square root network means including a second resistor in series with said output portion carrying said output current to produce an output voltage proportional to said output current, whereby the last said voltage is proportional to the square root of the product of P and D.

3. A device for measuring flow through an orifice in a pipe, said device including in combination a transducer having first and second inputs coupled on each side of the orifice to provide an electrical signal output from the transducer, a potentiometer coupled to receive the electrical signal output of said transducer said potentiometer having a variable tap movable in response to the pressure in the pipe to provide a varying potential across a portion of the potentiometer, a magnetic amplifier having an electrical signal input coupled to said potentiometer tap and an output signal, said amplifier including control, bias, and feedback windings wound on a saturable core reactor, and a square root network coupled to said magnetic amplifier for receiving said output signal therefrom said square root network including a resistor series coupled to said control winding and the portion of said potentiometer having a varying potential thereby preventing current flow in said control winding under steady state conditions while providing a voltage across said resistor proportional to the magnitude of said electrical signal input.

4. Flow meter apparatus utilized with a length of pipe having an orifice therein, said apparatus including in combination transducer means coupled to the pipe to respond to the pressure drop across the orifice, potentiometer means coupled to said transducer means, said potentiometer means including a portion responsive to variations in the pressure in the pipe, a magnetic amplifier coupled to said potentiometer means, said magnetic amplifier including a control winding, and a feedback winding, a source of direct current potential coupled to said bias winding, means including a first resistor in series with the feedback winding connecting said feedback winding and first resistor across the output of the magnetic amplifier, said feedback winding being wound for positive feedback, a square root network including second and third resistors connected in series across the output of said magnetic amplifier, and a fourth resistor series coupled between the output terminal of said magnetic amplifier to which said second resistor is coupled and a source of direct current potential, said square root network further including a plurality of rectifiers each connected in series with a portion of said fourth resistor and the juncture of said second and third resistors, and electric conductor means connecting in series said third resistor, said control winding and the portion of said potentiometer means responsive to variations in the pressure in the pipe.

5. Flow meter apparatus defined by claim 4 wherein said transducer means includes a mechanical input having first and second portions, said first portion of the mechanical input being coupled to one side of the orifice in the pipe and said second portion of the mechanical input being coupled to the other side of the orifice in the pipe.

References Cited in the file of this patent

UNITED STATES PATENTS

| | | |
|---|---|---|
| 2,574,438 | Rossi et al. | Nov. 6, 1951 |
| 2,605,962 | Berger | Aug. 5, 1952 |
| 2,718,144 | Hornfeck | Sept. 20, 1955 |
| 2,879,002 | Longerich | Mar. 24, 1959 |
| 2,927,462 | Li | Mar. 8, 1960 |

OTHER REFERENCES

Baxter: A Square Root Law Circuit (Electronic Engineering), March 1954, pp. 97–99.

Davis et al.: An Analogue Computer Technique Using Magnetic Amplifiers (Communications and Electronics), No. 16, January 1955, pp. 635–640.

Davidson: Basic Math. With A.C. Analogs (Control Engineering), vol. 2, No. 3, pp. 57–66, March 1955.